United States Patent
Sung

(12) United States Patent (10) Patent No.: US 7,435,296 B1
Sung (45) Date of Patent: Oct. 14, 2008

(54) DIAMOND BODIES GROWN ON SIC SUBSTRATES AND ASSOCIATED METHODS

(76) Inventor: Chien-Min Sung, 64 Chung-San Rd., Ying-Ko Factory, Taipei County (TW) 23911

( * ) Notice: Subject to any disclaimer, the term of this patent is extended or adjusted under 35 U.S.C. 154(b) by 190 days.

(21) Appl. No.: 11/407,385

(22) Filed: Apr. 18, 2006

(51) Int. Cl.
*C30B 25/12* (2006.01)

(52) U.S. Cl. .............................. 117/72; 117/68; 117/75; 423/446

(58) Field of Classification Search ................... 117/68, 117/72, 75; 423/446
See application file for complete search history.

(56) References Cited

U.S. PATENT DOCUMENTS

| | | | |
|---|---|---|---|
| 3,630,679 A | 12/1971 | Angus | |
| 4,927,619 A * | 5/1990 | Tsuji | .......................... 423/446 |
| 5,503,104 A | 4/1996 | Spiro | |
| 5,980,852 A * | 11/1999 | Burns et al. | .................. 423/446 |
| 6,497,853 B1 | 12/2002 | Davies et al. | |
| 6,616,725 B2 * | 9/2003 | Cho et al. | ...................... 75/231 |

FOREIGN PATENT DOCUMENTS

| | | |
|---|---|---|
| EP | 0322217 | 6/1989 |
| EP | 0689233 | 6/1995 |
| EP | 000290044 A1 * | 11/1999 |

* cited by examiner

*Primary Examiner*—Felisa C Hiteshew
(74) *Attorney, Agent, or Firm*—Thorpe North & Western LLP

(57) ABSTRACT

The present invention provides methods of forming high quality diamond bodies under high pressure, and the diamond bodies produced by such methods. In one aspect, a method is provided for growing a diamond body, including providing a non-particulate silicon carbide (SiC) mass having a pre-designed shape, placing the SiC mass under high pressure in association with a molten catalyst and a carbon source, and maintaining the SiC mass under high pressure to form a substantially monocrystalline diamond body. The diamond body may be formed across substantially all of the SiC mass having surface area exposed to the molten catalyst. As such, the diamond body may conform to the shape of the exposed surface area of the SiC mass.

31 Claims, 2 Drawing Sheets

DIAMOND BODIES GROWN ON SIC SUBSTRATES AND ASSOCIATED METHODS

FIELD OF THE INVENTION

The present invention relates generally to devices and methods for growing crystalline materials at high pressures and high temperatures. Accordingly, the present invention involves the fields of chemistry, metallurgy, materials science, physics, and high pressure technology.

BACKGROUND OF THE INVENTION

Diamond is an ideal material for many applications due to its extreme hardness, atomic density, and high thermal conductivity. As such, large diamond bodies would benefit numerous applications, including those involving tools, substrates, electronic components, etc. Diamond bodies comprised of essentially a single crystal orientation are highly sought after, particularly in association with semiconductors and heat spreaders.

For example, as computers and other electronic devices become smaller and faster, the demands placed on semiconductor devices utilized therein increase geometrically. These increased demands can create numerous problems due to the accumulation of charge carriers, i.e. electrons and holes that are intrinsic to quantum fluctuation. Accumulation of the carriers creates noise, and tends to obscure electrical signals within the semiconductor device. This problem is compounded as the temperature of the device increases. Much of the carrier accumulation may be due to the intrinsically low bonding energy and the directional anisotropy of typical semiconductor crystal lattices. Another problem may be a further result of current semiconductor materials. These semiconductors tend to have a high leaking current and a low break down voltage. As the size of semiconductor transistors and other circuit elements decrease, coupled with the growing need to increase power and frequency, current leak and break down voltage also become critical.

As power and frequency requirements increase and the size of semiconductor components decreases, the search for materials to alleviate these problems becomes crucial to the progress of the semiconductor industry. One material that may be suitable for the next generation of semiconductor devices is diamond. The physical properties of diamond, such as its high thermal conductivity, low intrinsic carrier concentration, and high band gap make it a desirable material for use in many high-powered electronic devices.

Methods for creating diamond layers can include known processes such as chemical vapor deposition (CVD), physical vapor deposition (PVD), and growth in high pressure apparatuses. Various CVD techniques have been used in connection with depositing diamond or diamond-like materials onto a substrate. Typical CVD techniques use gas reactants to deposit the diamond or diamond-like material in a layer, or film. These gases generally include a small amount (i.e. less than about 5%) of a carbonaceous material, such as methane, diluted in hydrogen. A variety of specific CVD processes, including equipment and conditions, are well known to those skilled in the art.

Though single crystal diamond films can be grown using CVD processes, they are currently very expensive and slow to grow to a sufficient thickness to be useful as a diamond body or a diamond substrate. CVD deposited polycrystalline diamond (PCD) layers, on the other hand, can be grown to a sufficient thickness more rapidly and with less expense. Grain boundaries inherent to the PCD layer, however, will create dislocations in the crystal lattice of any material deposited thereon, thus precluding their use in those applications requiring high quality crystal lattices. PVD processes create similar grain boundary issues, and are thus not desirable for many applications.

Unfortunately, currently known high pressure crystal synthesis methods also have several drawbacks which limit their ability to produce large, high-quality crystal bodies. For example, isothermal processes are generally limited to production of smaller crystals useful as superabrasives in cutting, abrading, and polishing applications. Temperature gradient processes can be used to produce larger diamonds; however, production capacity and quality are limited. Several methods have been utilized in an attempt to overcome these limitations. Some methods incorporate multiple diamond seeds; however, a temperature gradient among the seeds prevents achieving optimal growth conditions at more than one seed. Some methods involve providing two or more temperature gradient reaction assemblies such as those described in U.S. Pat. No. 4,632,817. Unfortunately, high quality diamond is typically produced only in the lower portions of these reaction assemblies. Some of these methods involve adjusting the temperature gradient to compensate for some of these limitations. However, such methods cost additional expense and require control of variables in order to control growth rates and diamond quality simultaneously over different temperatures and growth materials.

Therefore, apparatuses and methods which overcome the above difficulties would be a significant advancement in the area of high pressure crystal growth, and continue to be sought.

SUMMARY OF THE INVENTION

Accordingly, the present invention provides methods of forming high quality diamond bodies under high pressure, and the diamond bodies produced by such methods. In one aspect, a method is provided for growing a diamond body, including providing a non-particulate silicon carbide (SiC) mass having a pre-designed shape, placing the SiC mass under high pressure in association with a molten catalyst and a carbon source, and maintaining the SiC mass under high pressure to form a substantially monocrystalline diamond body. The diamond body may be formed across substantially all of the SiC mass having surface area exposed to the molten catalyst. As such, the diamond body may conform to the shape of the exposed surface area of the SiC mass.

In a specific aspect, a method of forming a diamond body may include placing a non-particulate SiC mass into a high pressure apparatus, placing a metal catalyst into the high pressure apparatus, placing a carbon source into the high pressure apparatus, and applying a pressing force to the high pressure apparatus. The pressing force is maintained for a time sufficient to form a substantially monocrystalline diamond body across substantially all of the SiC mass having surface area exposed to the molten catalyst. The pressing force is sufficient to provide high pressures within the high pressure apparatus sufficient to alter the metal catalyst to a molten catalyst. In one aspect, applying a pressing force to the high pressure apparatus may further include applying thermal energy to the SiC mass sufficient to generate a high temperature. In another aspect it may be beneficial to cycle the thermal energy during the growth of the diamond body.

The high pressure apparatus may be any high pressure apparatus known to one of ordinary skill in the art, including split die devices, girdle devices, belt devices, piston-cylinder presses, toroidal devices, and combinations thereof. The high pressure apparatus should be capable of generating a pressing force sufficient to provide ultrahigh pressures. In one aspect, ultrahigh pressures range from about 4 GPa to about 7 GPa. In another aspect, ultrahigh pressures range from about 5 GPa to about 6 GPa.

Following growth, the diamond body may undergo post-growth processing. In one aspect, the diamond body may be separated from the SiC mass. Various post-growth processing procedures (e.g. cutting, polishing, shaping, grinding, etc.) can be performed prior to or following separation of the diamond body from the SiC mass. In one aspect, the diamond body may be shaped into a lens. In another aspect, the diamond body may be cut into at least one gemstone. It is also contemplated that in various aspects at least a portion of the SiC mass may remain associated with the diamond body to provide support and/or functionality to the diamond body for a particular use.

Various configurations for the SiC mass are contemplated, which will vary depending on the intended use of the resulting diamond body. In order to form a substantially monocrystalline diamond body, however, it may be beneficial for the silicon carbide mass to be a substantially single crystal silicon carbide mass. By utilizing a SiC mass having substantially a single crystal orientation, the resulting diamond body may be substantially monocrystalline. The substantially monocrystalline growth of the diamond body may be facilitated by depositing a diamond layer onto at least a portion of the silicon carbide mass prior to placing the silicon carbide mass under high pressure. In one aspect, the diamond layer may be a conformal diamond layer.

Various diamond body shapes can be formed depending on the shape and configuration of the SiC mass. Though smaller diamond bodies are contemplated, in one aspect, the silicon carbide mass may be greater than about 1 cm in size, thus allowing the formation of diamond bodies that are greater than 1 cm in size. Also, those SiC masses having a single planar face exposed to the molten catalyst tend to form the diamond body substantially in a single direction perpendicular to the exposed plane of the SiC mass. As such, the resulting diamond body may substantially conform to the shape of the exposed plane. For example, by utilizing a SiC mass in the form of a SiC wafer, in one aspect the resulting diamond body may grow out from the wafer as a diamond cylinder. In another aspect, the diamond body may be formed as a sheet.

The molten catalyst may include a metal catalyst selected from the group consisting of Cr, Mn, Fe, Co, Ni, and combinations and alloys thereof. In another aspect the molten catalyst may include an Fe—Ni alloy. Various carbon sources may also be utilized for the growth of diamond bodies. In one aspect, the carbon source may include a material selected from the group consisting of graphite, diamond, diamond powder, nanodiamond, microdiamond, and combinations thereof. In another aspect, the carbon source may be graphite. In yet another aspect, the graphite may include a low resistivity graphite. In a further aspect, the carbon source can include nanodiamond.

Figure 1:
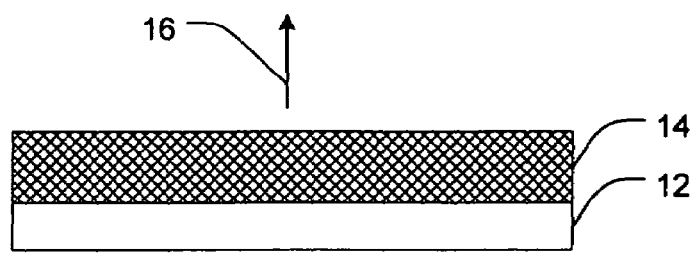
FIG. 1 is a cross-sectional view of a diamond body in accordance with an embodiment of the present invention.

The above figures are provided for illustrative purposes only. It should be noted that actual dimensions of layers and features may differ from those shown.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

The singular forms "a," "an," and "the" include plural referents unless the context clearly dictates otherwise. Thus, for example, reference to "a diamond segment" includes reference to one or more of such segments, and reference to "a high pressure apparatus" includes reference to one or more of such devices.

DEFINITIONS

In describing and claiming the present invention, the following terminology will be used in accordance with the definitions set forth below.

As used herein, "high pressure assembly" refers to at least a portion of the high pressure apparatus in which conditions can be maintained at high pressure or ultrahigh pressure sufficient for growth of materials which are placed therein, e.g. usually the high pressure assembly can contain a carbon source, a catalyst material, and diamond seeds. These materials may be placed in the high pressure assembly at least partially surrounded by a pressure medium and/or gasket assembly. However, those skilled in the art will recognize that the high pressure assembly can be formed of almost any material which can then be subjected to high pressure for such purposes as chemical reactions, crystalline growth, high pressure property measurements, and the like. A wide variety of high pressure assemblies are known and can be used in the present invention. Such high pressure assemblies can also include inert gaskets, separators, or other materials which improve high-pressure/high-temperature conditions.

As used herein, "high pressure" refers to pressures above about 1 MPa and preferably above about 200 MPa.

As used herein, "ultrahigh pressure" refers to pressures from about 1 GPa to about 15 GPa, and preferably from about 4 GPa to about 7 GPa.

As used herein, "alloy" refers to a solid solution or liquid mixture of a metal with a second material, said second material may be a non-metal, such as carbon, a metal, or an alloy which enhances or improves the properties of the metal.

As used herein, the term "non-particulate" refers to a material that that is larger that particle size. For example, in one aspect non-particulate may refer to materials having an approximate size greater than about 2 mm. In another aspect, non-particulate may refer to materials having an approximate size greater than about 5 mm. In yet another aspect, non-particulate may refer to materials having an approximate size greater than about 10 mm. In a further aspect, non-particulate may refer to materials having an approximate size greater than about 50 mm. In a yet a further aspect, non-particulate may refer to materials having an approximate size greater than about 1 cm.

As used herein, "SiC mass" refers to a substrate made of SiC used for growing a diamond body thereupon. It is intended that a SiC mass be non-particulate.

As used herein with respect to an identified property or circumstance, "substantially" refers to a degree of deviation that is sufficiently small so as to not measurably detract from the identified property or circumstance. The exact degree of deviation allowable may in some cases depend on the specific context. Thus, for example, a source material which has a composition "substantially" that of a particular region may deviate in composition or relevant property by experimental error up to several percent, e.g., 1% to 3%.

As used herein, the term "substantially monocrystalline" refers to a material having a crystal lattice with a substantially uniform orientation. In one aspect, substantially uniform orientations may be within about 5°. In another aspect, a substantially uniform crystal lattice may exhibit no visible grain boundaries or grain structures when observed with a naked eye.

As used herein, "inclusion" refers to entrapment of non-diamond material within a growing crystal. Frequently, the inclusion is a catalyst metal enclosed within the crystal under rapid growth conditions. Alternatively, inclusions can be the result carbon deposits forming instead of diamond at the interface between a crystal growth surface of the diamond and the surrounding material. In general, inclusions are most often formed by the presence of substantial amounts of carbon at the growth surface of the diamond and/or inadequate control of temperature and pressure conditions during high-pressure/high-temperature growth.

As used herein, "thermal contact" refers to proximity between materials which allows for thermal transfer from one material to another. Therefore, thermal contact does not require that two materials be in direct physical contact. Materials can be chosen having various thermal conductivities so as to enhance or hinder thermal contact between materials as desired.

As used herein, "gem quality" refers to crystals having no visible irregularities (e.g., inclusions, defects, etc.) when observed by the unaided eye. Crystals grown in accordance with the present invention exhibit a comparable gem quality to that of natural crystals which are suitable for use in jewelry.

As used herein, "metallic" refers to any type of material or compound wherein the majority portion of the material is a metal. Examples of various metals considered to be particularly useful in the practice of the present invention include, without limitation: aluminum, tungsten, molybdenum, tantalum, zirconium, vanadium, chromium, copper, and alloys thereof.

As used herein, the terms "diamond layer," "sheet of diamond," "diamond body," etc., refer to any structure, regardless of shape, which contains diamond-containing materials. Thus, for example, a diamond film partially or entirely covering a surface is included within the meaning of these terms. Additionally, a layer of a material, such as metals, acrylics, or composites, having diamond particles disbursed therein is included in these terms.

As used herein, "diamond-containing materials" refer to any of a number of materials which include carbon atoms bonded with at least a portion of the carbons bonded in at least some $sp^3$ bonding. Diamond-containing materials can include, but are not limited to, natural or synthetic diamond, polycrystalline diamond, diamond-like carbon, amorphous diamond, and the like.

As used herein, "grain boundaries" are boundaries in a crystalline lattice formed where adjacent seed crystals have grown together. An example includes polycrystalline diamond, where numerous seed crystals having grains of different orientations have grown together to form a heteroepitaxial layer.

As used herein, "crystal dislocations" or "dislocations" can be used interchangeably, and refer to any variation from essentially perfect order and/or symmetry in a crystalline lattice.

As used herein, "vapor deposited" refers to materials which are formed using vapor deposition techniques. "Vapor deposition" refers to a process of depositing materials on a substrate through the vapor phase. Vapor deposition processes can include any process such as, but not limited to, chemical vapor deposition (CVD) and physical vapor deposition (PVD). A wide variety of variations of each vapor deposition method can be performed by those skilled in the art. Examples of vapor deposition methods include hot filament CVD, rf-CVD, laser CVD (LCVD), laser ablation, conformal diamond coating processes, metal-organic CVD (MOCVD), sputtering, thermal evaporation PVD, ionized metal PVD (IMPVD), electron beam PVD (EBPVD), reactive PVD, and the like.

As used herein, "chemical vapor deposition," or "CVD" refers to any method of chemically depositing diamond or other particles in a vapor form upon a surface. Various CVD techniques are well known in the art.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 24, and from 3-5, etc.

This same principle applies to ranges reciting only one numerical value. Furthermore, such an interpretation should apply regardless of the breadth of the range or the characteristics being described.

THE INVENTION

Although single crystal diamond films can be CVD deposited without grain boundaries, the cost is often prohibitive for deposing thick layers of diamond, particularly for use in the semiconductor arts where high quality semiconductor layers are vital. As such, it would be desirable to produce diamond bodies or layers that are less expensive to make and can be much thicker than CVD diamond. Such diamond bodies can be used for any purpose known to one skilled in the art, including, without limitation, epitaxial growth substrates for single crystal layers such as CVD diamond and CVD cubic boron nitride (cBN), electrical insulators, electronic components, heat spreaders, acoustic devices such as surface acoustic wave (SAW) filters, tools, gem quality stones, silicon-on-diamond layers, light sources, lenses, etc. As such, the present invention provides methods for forming thick, high quality diamond bodies, including layers.

The inventor has discovered that the high pressure growth of diamond on a silicon carbide (SiC) substrate can effectively produce a high quality solid diamond body that is continuous in structure. The rate of growth of diamond on a SiC substrate is much higher for high pressure growth than for CVD diamond growth. This increased growth rate may be influenced by a number of factors, including the carbon content in SiC, the liquid nature of high pressure growth versus the gas nature of CVD growth, and the multiple crystal faces available for growth on SiC, namely the cubic (100) face and the octahedral (111) face. This combination of similar materials, higher growth medium density, and increased number of growth planes may greatly enhance the rate at which a diamond body is formed. Because the SiC material is seeding the growth of the diamond, single crystal SiC substrates can be used to orient the crystal lattice of the diamond body during growth, and thus allow the epitaxial formation of substantially single crystal diamond bodies. In one aspect, the SiC substrate can be a single crystal having a (100) orientation.

The formation of a substantially monocrystalline diamond body can be further facilitated by etching pits into the SiC material. These pits will cause nucleation sites to occur in close proximity so they can merge into a substantially single crystal due to the short distance of epitaxial growth over the SiC material. As such, the diamond body will be joined together at an early stage of growth when the deviation in lattice orientation from the underlying SiC crystal is negligible, and thus a continuous lattice may be formed with little or no grain boundaries.

Accordingly, the present invention provides methods of forming high quality diamond bodies under high pressure, as well as the diamond bodies produced by such methods. In one aspect, a method is provided for growing a diamond body, including providing a non-particulate SiC mass having a pre-designed shape, placing the SiC mass under high pressure in association with a molten catalyst and a carbon source, and maintaining the SiC mass under high pressure to form a substantially monocrystalline diamond body. The diamond body may be formed across substantially all of the SiC mass having surface area exposed to the molten catalyst. As such, the diamond body may conform to the shape of the exposed surface area of the SiC mass.

In a specific aspect, a method of forming a diamond body may include placing a non-particulate SiC mass into a high pressure apparatus, placing a metal catalyst into the high pressure apparatus, placing a carbon source into the high pressure apparatus, and applying a pressing force to the high pressure apparatus. The pressing force may be maintained for a time sufficient to form a substantially monocrystalline diamond body across substantially all of the SiC mass having surface area exposed to the molten catalyst. The pressing force is sufficient to provide high pressures within the high pressure apparatus sufficient to alter the metal catalyst into a molten catalyst. In one aspect, applying a pressing force to the high pressure apparatus may further include applying thermal energy to the SiC mass sufficient to generate a high temperature.

In another aspect of the present invention, it may be beneficial to cycle the thermal energy during the growth of the diamond body. Such cycling may decrease any lattice mismatch between th SiC mass and the forming diamond body. As such, the molten catalyst may be heated to a temperature that is sufficient to cause a portion of the SiC mass to dissolve. The molten catalyst can then be cooled to a lower temperature to allow carbon to deposit. This will occur because the liquid of the molten catalyst is saturated with carbon but is under-saturated with Si. By cycling the temperature between heating and cooling while decreasing the difference between the upper temperature and the lower temperature, the Si:C ratio at the growth interface will gradually decrease so that diamond may be eventually formed substantially homo-epitaxially. Additionally, it may be beneficial to decrease the time between heating and cooling to further facilitate the formation of the diamond body.

Various configurations for the SiC mass are contemplated, which will vary depending on the intended use of the resulting diamond body. The formation of a substantially monocrystalline diamond body, however, may be facilitated by utilizing a substantially single crystal silicon carbide mass. Lattice mismatches and dislocations within a SiC mass will often translate into the crystal lattice of the diamond body during growth, thus forming a lattice with multiple crystal orientations. High pressure growth of diamond on a SiC mass having a single crystal orientation will be epitaxial, thus resulting in a diamond body which is substantially monocrystalline. One convenient source of high quality substantially-single crystal SiC substrates are the commercially available SiC wafers used for semiconductor and LED manufacturing. These wafers can be used "as is" to grow diamond bodies thereon, or they may be shaped into various shapes in order to control the shape of the resulting diamond body.

In one aspect, the substantially monocrystalline growth of the diamond body may be further facilitated by depositing a diamond layer onto at least a portion of the silicon carbide mass prior to placing the silicon carbide mass under high pressure. In another aspect, a layer of boron nitride may be deposited onto the SiC mass such that the diamond body is formed on the boron nitride layer. Boron nitride has a smaller lattice than SiC, and may be more compatible with the diamond lattice. Although boron nitride often has an amorphous or a hexagonal form, under the high pressure of diamond formation it will rearrange to form a diamond-like structure, e.g. cubic boron nitride. Numerous methods of depositing diamond and boron nitride layers are known to those skilled in the art, all of which are considered to be within the scope of the present invention. Such methods may include, for example, vapor deposition techniques, sputtering, etc.

Any number of known vapor deposition techniques may be used to form the diamond or boron nitride layers. The most common vapor deposition techniques include chemical vapor deposition (CVD) and physical vapor deposition (PVD), although any similar method can be used if similar properties and results are obtained. In one aspect, CVD techniques such as hot filament, microwave plasma, oxyacetylene flame, rf-CVD, laser CVD (LCVD), metal-organic CVD (MOCVD), laser ablation, conformal diamond coating processes, and direct current arc techniques may be utilized. Typical CVD techniques use gas reactants to deposit the diamond or diamond-like material in a layer, or film. These gases generally include a small amount (i.e. less than about 5%) of a carbonaceous material, such as methane, diluted in hydrogen. A variety of specific CVD processes, including equipment and conditions, as well as those used for boron nitride layers, are well known to those skilled in the art.

In one aspect of the present invention, the diamond layer may be a conformal diamond layer. Conformal diamond coating processes can provide a number of advantages over conventional diamond film processes. Conformal diamond coating can be performed on a wide variety of substrates, including non-planar substrates. A growth surface can be pretreated under diamond growth conditions in the absence of a bias to form a carbon film. The diamond growth conditions can be conditions which are conventional CVD deposition conditions for diamond without an applied bias. As a result, a thin carbon film can be formed which is typically less than about 100 angstroms. The pretreatment step can be performed at almost any growth temperature such as from about 200° C. to about 900° C., although lower temperatures below about 500° C. may be preferred. Without being bound to any particular theory, the thin carbon film appears to form within a short time, e.g., less than one hour, and is a hydrogen terminated amorphous carbon.

The SiC mass can then be subjected to diamond growth conditions to form the diamond film as a conformal diamond film. The diamond growth conditions can be those conditions which are commonly used in traditional CVD diamond growth. However, unlike conventional diamond film growth, the diamond film produced using the above pretreatment steps results in a conformal diamond film. Further, the diamond film typically begins growth substantially over the entire substrate with substantially no incubation time. In addition, a continuous film, e.g. substantially no grain boundaries, can develop within about 80 nm of growth.

Although suitable conditions can vary, process temperatures can be held below about 500° C. with good results. For example, temperatures from about 250° C. to about 500° C. can be useful and from about 300° C. to about 450° C. may generally be preferred. Growth conditions do not need to be the same as those used during the pretreatment step and can vary substantially therefrom. For example, conventional CVD diamond growth conditions can be used in the pretreatment step to form the thin carbon film, while plasma or laser ablation conditions can be used during the growth step.

Various diamond body shapes can be formed depending on the shape and configuration of the SiC mass. Though smaller diamond bodies are contemplated, in one aspect, the SiC mass may be greater than about 1 cm in size, thus allowing the formation of diamond bodies that are greater than 1 cm in size. It should be noted that the measurement of 1 cm may be a diameter for circular objects, a length measurement for rectangular and irregularly shaped object, etc. Thus it is intended that any SiC mass having at least one linear measurement that is at least 1 cm be considered to be included within the definition of 1 cm.

Figure 2:
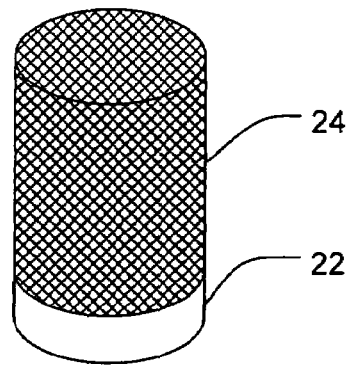
FIG. 2 is a perspective view of a diamond body in accordance with another embodiment of the present invention.
Figure 3:
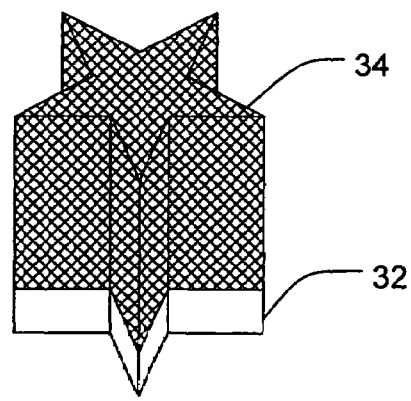
FIG. 3 is a perspective view of a diamond body in accordance with yet another embodiment of the present invention.

Those SiC masses having a single planar face exposed to the molten catalyst tend to form the diamond body substantially in a single direction perpendicular to the exposed plane of the SiC mass. As such, the resulting diamond body may substantially conform to the shape of the exposed plane. FIG. 1, for example, shows a SiC mass 12 having a diamond body 14 grown thereon. The diamond body 14 grows in a direction 16 that is approximately perpendicular to the plane of the SiC mass 12. Thus in one aspect shown in FIG. 2, by utilizing a SiC mass 22 in the form of a SiC wafer or other circular shape, the resulting diamond body grows out from the SiC mass 22 as a diamond cylinder 24. Similarly, FIG. 3 shows another aspect utilizing a SiC mass 32 in the shape of a star. A diamond body grown by the methods of the present invention on such a star shaped substrate grows as an elongated star shaped diamond body 34. As such, the shape of the resulting diamond body will correlate to the shape of the SiC mass upon which it was grown. Also, thickness can be regulated by varying the growth time of the diamond body. For example, in one aspect a diamond body in the form of a diamond sheet may be formed upon a square SiC mass. The same shape of SiC mass can be used to form a cube by allowing longer growth times for the diamond body.

In many cases, the diamond body will form across substantially all of the SiC mass having surface area that is exposed to the molten catalyst. It is contemplated that regions of exposed surface area can be masked to preclude the growth of diamond thereupon. Masking can be accomplished by any means known to one of ordinary skill in the art. For example, any material that would preclude the growth of diamond and that can withstand the temperatures whereby the diamond body is grown may be utilized as a masking material. Examples of such materials may include, without limitation, Ti, W, Pt, Ta, Zr, Mo, NaCl, pyrophillite, quartz, ceramics such as $Al_2O_3$, $Si_3N_4$, $ZrO_2$, etc., and combinations thereof.

Following growth, the diamond body may undergo post-growth processing. In one aspect, the diamond body may be separated from the SiC mass. Separation can be performed by a variety of methods, such as grinding, cutting, etching, polishing, etc. Various post-growth processing procedures (e.g. cutting, polishing, shaping, etc.) can be performed on the diamond body prior to or following separation of the diamond body from the SiC mass. For example, it may be beneficial to utilize the SiC mass to hold the diamond body during post-growth processing. This may be particularly beneficial when the diamond body is thin or otherwise fragile. By maintaining the association with the SiC mass, the integrity of such diamond bodies may be maintained during high stress operations such as grinding, that would otherwise damage the diamond body. Various diamond products or structures may be constructed from the diamond bodies grown by the methods of the present claims. For example, in one aspect the diamond body may be shaped into a lens. In another aspect, the diamond body may be cut into at least one gemstone. In yet another aspect, the diamond body can be separated from the SiC mass to be used as a heat spreader.

It is also contemplated that in various aspects at least a portion of the SiC mass may remain associated with the diamond body to provide support and/or functionality to the diamond body for a particular use. For example, in one aspect a portion of the SiC mass may be left associated with the diamond body following grinding or etching. Such a SiC/diamond structure can be utilized to grow epitaxial layers thereon for use as a semiconductor or LED substrate.

Various high pressure methods of generating diamond growth are known to those of ordinary skill in the art, and all are considered to be within the scope of the present invention. Typically, either isothermal methods or temperature gradient methods are used to synthesize diamond. Each method takes advantage of the solubility of carbon under various conditions, e.g., temperature, pressure, and concentrations of materials. In one aspect, an isothermal method involves the use of a carbon source material and a metal catalyst. The carbon source may be graphite or other forms of carbon material as described herein. Under high pressures and high temperatures, graphite is much more soluble in a molten catalyst than diamond. Therefore, graphite tends to dissolve or disperse into the molten catalyst, or create a colloidal suspension therewith, up to a saturation point. Excess carbon can then precipitate out as diamond along the surface of the SiC mass. Typically, the growth surface of a diamond segment may be covered by a thin envelope of the molten catalyst. In this case, the carbon can dissolve into and diffuse across the molten catalyst envelope toward the growing diamond body.

In another aspect, a temperature gradient method involves maintaining a temperature gradient between a carbon source and the SiC mass which are separated by a relatively thick layer of molten catalyst. The carbon source is kept at a relatively higher temperature than the surface of the SiC mass and/or the forming diamond body. It is important to note that the carbon is more soluble in the hotter regions. As the carbon diffuses toward the cooler regions along the surface of the SiC mass and/or the growing diamond body, the solubility of the carbon is reduced. This decrease in solubility causes the carbon to precipitate as diamond at the growth surface of the diamond body. Typically, the molten catalyst layer is relatively thick in order to maintain a sufficient temperature gradient, e.g., 20° C. to 50° C.

As the diamond body begins to form, metal from the molten catalyst may become trapped along the growth surface. This may not be problematic depending on the intended use of the resulting diamond body. For example, if the diamond body is to be utilized as a substrate for further epitaxial growth of a single crystal layer such as CVD deposited diamond, metal inclusions in the grain boundary may not affect the epitaxial growth of the CVD diamond layer. Similarly, heat spreaders, gemstones, tools, etc., may often not be affected by metal trapped in the grain boundary.

Other intended uses for the resulting diamond body, however, may be compromised by significant amounts of metal in the grain boundary. In these cases, the amount of metal inclusions can be minimized or eliminated by slowing the deposition rate of the diamond. Additionally, thermal cycling can be utilized to minimize metal inclusions as well as crystal dislocations from the growth surface of the diamond body. Furthermore, a slower rate of thermal cycling and a more precise control of the temperature of the cycling may decrease the frequency of metal inclusions and crystal dislocations. By cycling through periods of partial melting and growth, metal inclusions, contaminants, and imperfections in the crystal lattice along the growth surface are pushed out of the forming diamond body. This is partially due to the fact that a pure crystal lattice has a lower free energy than regions of crystal dislocation and metal impurities. As such, those impure regions will be preferentially melted and replaced with a more pure crystal lattice.

Additional devices and methods for growing high quality diamond material are described in U.S. patent application Ser. Nos. 10/926,576 filed Aug. 25, 2005, 10/757,715 filed Jan. 13, 2004, and 10/775,042 filed Feb. 6, 2004, each of which are incorporated herein by reference.

The metal catalyst can include any suitable metal catalyst material, depending on the desired grown crystal. Metal catalyst materials suitable for diamond synthesis can include metal catalyst powders, solid layers, or solid plates comprising any metal or alloy which includes a carbon solvent capable of promoting growth of diamond from carbon source materials. Non-limiting examples of suitable metal catalyst materials can include Fe, Ni, Co, Mn, Cr, and alloys thereof. Several common metal catalyst alloys can include Fe—Ni, e.g., INVAR alloys, Fe—Co, Ni—Mn—Co, and the like. In specific aspects, metal catalyst materials may be Fe—Ni alloys, such as Fe-35Ni, Fe-31Ni-5Co, Fe-50Ni, and other INVAR alloys. Alternatively, metal catalysts can be formed by stacking layers of different materials together to produce a multi-layered metal catalyst layer or by providing regions of different materials within the catalyst layer. For example, nickel and iron plates or compacted powders can be layered to form a multi-layered Fe—Ni catalyst layer. Such a multi-layered catalyst layer can reduce costs and/or be used to control growth conditions by slowing or enhancing initial growth rates at a given temperature. In addition, the catalyst materials under diamond synthesis can include additives which control the growth rate and/or impurity levels of diamond, i.e. via suppressing carbon diffusion, prevent excess nitrogen and/or oxygen from diffusing into the diamond, or effect crystal color. Suitable additives can include Mg, Ca, Si, Mo, Zr, Ti, V, Nb, Zn, Y, W, Cu, Al, Au, Ag, Pb, B, Ge, In, Sm, and compounds of these materials with C and B.

The metal catalyst may be of any suitable spatial dimension which allows for diffusion of the carbon source into the catalyst layer and, in some cases, the maintenance of a temperature gradient. Typically, the metal catalyst can form a layer from about 1 mm to about 20 mm in thickness. However, thicknesses outside this range can be used depending on the desired growth rate, magnitude of temperature gradient, and the like.

The carbon source can be configured to provide a source of carbon for growth of a desired diamond body. Under diamond growth conditions, the carbon source may comprise a material such as graphite, amorphous carbon, diamond, diamond powder, microdiamond, nanodiamond, and combinations thereof. In one aspect of the present invention, the carbon source layer can comprise a graphite, such as a high purity graphite. Although a variety of carbon source materials can be used, graphite generally provides good crystal growth and improves homogeneity of the grown diamond. Further, low resistivity graphite may also provide a carbon source material which can also be readily converted to diamond. However, consideration should be given to the volume reduction associated with conversion of graphite to diamond. When using graphite as a carbon source, the pressure may decay as a result of volume reduction as the graphite is converted to diamond. One optional way to reduce this problem is to design a high pressure apparatus that continues to increase the pressure to compensate for the volume reduction and thus maintain a desired pressure. Despite higher manufacturing costs, using diamond powder as a carbon source may also reduce the degree of volume reduction, and thus increase the time during which optimal pressure conditions can be maintained.

The pressing force delivered to or by the high pressure apparatus may vary according to the method of delivery and the intended configuration of the resulting diamond body. As such, pressures outside the ranges disclosed herein may prove to be functional in joining diamond segments into a diamond body, and are thus considered to be included in the scope of the present invention. As such, the pressing force may be sufficient to provide ultrahigh pressures. In one aspect, the ultrahigh pressures may be from about 4 GPa to about 7 GPa. In another aspect, the ultrahigh pressures may be from about 5 GPa to about 6 GPa.

Various high pressure devices capable of delivering suitable high pressures are known to those skilled in the art, and all are considered to also be within the present scope. It is intended that high pressure apparatus include an apparatus for producing high pressures or ultrahigh pressures, and any chamber, assembly, or other enclosure for containing the diamond segments, the molten catalyst, and the carbon source. As such, an apparatus may include split die devices, girdle devices, belt devices, piston-cylinder press, and toroidal devices. In one specific aspect, the high pressure apparatus may be a split die device.

In certain high pressure growth methods, thermal energy may be applied to the SiC mass, molten catalyst, and carbon source that is sufficient to generate a high temperature. In one aspect, an electrical current can then be passed through either a graphite heating tube or graphite carbon source directly. This resistive heating of the catalyst material can be sufficient to cause melting of the metal catalyst, e.g., typically, without limitation, about 1300° C. for diamond. Under such conditions of high pressure and high temperature, the carbon source can dissolve into the molten catalyst and precipitate out in a crystalline form as diamond along the growth surface of the SiC mass. Also, as described herein, the thermal energy applied can be cycled in order to decrease crystal dislocations and metal inclusions within the growing diamond body.

Figure 4:
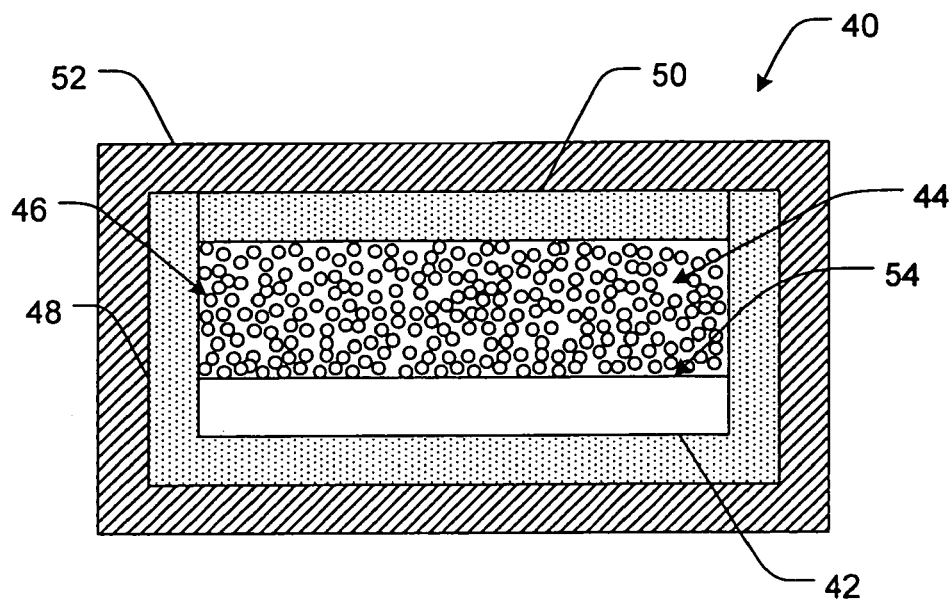
FIG. 4 is a cross-sectional view of a high pressure assembly in accordance with an embodiment of the present invention.

According to one aspect, FIG. 4 shows an example of a high pressure assembly 40 to be located within a high pressure apparatus (not shown) for forming a diamond body. The high pressure assembly 40 may include a SiC mass 42 arranged within an internal space 44. In this aspect, nanodiamond particles 46 are located within the internal space 44 along with the SiC mass 42. The metal catalyst is provided by a metal catalyst cup 48 and/or a metal catalyst lid 50. The metal catalyst cup 48 and lid 50 are surrounded by a layer of graphite 52. The layer of graphite 52, functions to provide pressure transmission from the high pressure apparatus to the internal space 44, an electrical current path for heating, and additional carbon source material for growth within the molten catalyst. As high pressure and possibly heat are applied to the high pressure assembly 40, at least a portion of the metal catalyst melts to form the molten catalyst and the carbon source melts. Diamond growth occurs along the growth surface 54 of the SiC mass 42 as described herein, thus forming a diamond body.

Figure 5:
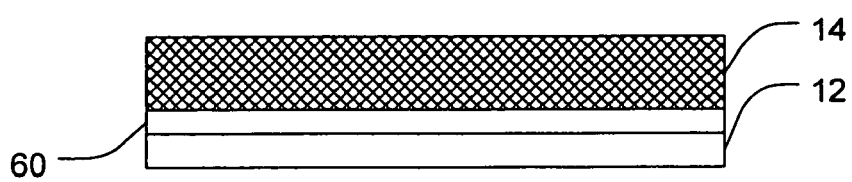
FIG. 5 is a perspective view of a diamond body in accordance with another embodiment of the present invention.
Figure 6:
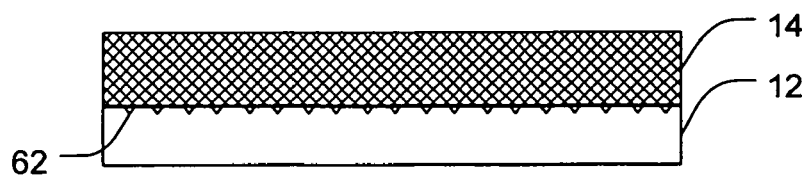
FIG. 6 is a perspective view of a diamond body in accordance with yet another embodiment of the present invention.

According to another aspect, FIG. 5 shows an example of a SiC mass 12 having a boron nitride layer 60 coated thereon, and having a diamond body 14 grown on the boron nitride layer 60. In yet another aspect, FIG. 6 shows a SiC mass 12 having a diamond body 14 grown thereon. Pits 62 have been etched in the SiC mass 12 to allow nucleation to occur as described herein. Etching can occur by any means know to one of ordinary skill in the art, such as, for example, sandblasting, rubbing, scratching, etc.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method for growing a diamond body, comprising:
providing a non-particulate silicon carbide mass having a pre-designed shape;
placing the silicon carbide mass under high pressure in association with a molten catalyst and a carbon source; and
maintaining the silicon carbide mass under high pressure to form a substantially monocrystalline diamond body
wherein the diamond body is grown epitaxially on the silicon carbide mass; and separating the diamond body from the silicon mass.

2. The method of claim 1, wherein the substantially monocrystalline diamond body is formed across substantially all of the silicon carbide mass having surface area exposed to the molten catalyst.

3. The method of claim 1, wherein the silicon carbide mass is a substantially single crystal silicon carbide mass.

4. The method of claim 3, wherein the silicon carbide mass has a (100) orientation.

5. The method of claim 1, wherein the silicon carbide mass is greater than about 1 cm in size.

6. The method of claim 1, wherein the silicon carbide mass is a silicon carbide wafer.

7. The method of claim 1, wherein the molten catalyst includes a metal catalyst selected from the group consisting of Cr, Mn, Fe, Co, Ni, and combinations and alloys thereof.

8. The method of claim 7, wherein the molten catalyst includes an Fe—Ni alloy.

9. The method of claim 1, wherein the carbon source includes a member selected from the group consisting of graphite, amorphous carbon, diamond, diamond powder, nanodiamond, microdiamond, and combinations thereof.

10. The method of claim 9, wherein the carbon source is graphite.

11. The method of claim 10, wherein the graphite includes a low resistivity graphite.

12. The method of claim 9, wherein the carbon source includes nanodiamond.

13. the method of claim 1, further comprising shaping the diamond body into a lens.

14. The method of claim 1, further comprising cutting the diamond body into at least one gemstone.

15. The method of claim 1, wherein the diamond body is formed substantially in a single direction.

16. The method of claim 15, wherein the diamond body is a cylindrical diamond body.

17. The method of claim 15, where in the diamond body is a rectangular diamond body.

18. The method of claim 1, further comprising depositing a diamond layer onto at least a portion of the silicon carbide mass prior to placing the silicon carbide mass under high pressure.

19. The method of claim 1, further comprising depositing a boron nitride layer onto at least a portion of the silicon carbide mass such that the diamond body is formed on the boron nitride layer.

20. A method of forming a diamond body, comprising:
placing a non-particulate silicon carbide mass into a high pressure apparatus;
placing a metal catalyst into the high pressure apparatus;
placing a carbon source into the high pressure apparatus;
applying a pressing force to the high pressure apparatus which is sufficient to provide high pressures within the high pressure apparatus sufficient to alter the metal catalyst to a molten catalyst;
maintaining the pressing force for a time sufficient to form a substantially monocrystalline diamond body across substantially all of the silicon carbide mass having surface area exposed to the molten catalyst;
heating the molten catalyst to an upper temperature sufficient to cause a portion of the silicon carbide mass to dissolve;
cooling the molten catalyst to a lower temperature allow carbon to deposit; and
cycling the temperature between heating and cooling while decreasing the upper temperature to form a substantially homo-epitaxial monocrystalline diamond layer on the silicon carbide mass.

21. The method of claim 20, wherein applying a pressing force to the high pressure apparatus further includes applying thermal energy to the silicon carbide mass sufficient to generate a high temperature.

22. The method of claim 21, wherein applying thermal energy to the silicon carbide mass includes cycling the thermal energy.

23. The method of claim 20, wherein the high pressure apparatus is selected from the group consisting of split die devices, girdle devices, belt devices, piston-cylinder presses, toroidal devices, and combinations thereof.

24. The method of claim 23, wherein the high pressure apparatus is a split die device.

25. The method of claim 20, wherein the pressing force is sufficient to provide ultrahigh pressures.

26. The method of claim 25, wherein the ultrahigh pressures are from about 4 GPa to about 7 GPa.

27. The method of claim 25, wherein the ultrahigh pressures are from about 5 GPa to about 6 GPa.

28. The method of claim 20, wherein the substantially monocrystalline diamond body is formed epitaxially on the silicon carbide mass.

29. The method of claim 20, wherein cycling the temperature between heating and cooling further includes decreasing time between heating and cooling.

30. The method of claim 20, further comprising disposing a layer of boron nitride on the silicon carbide mass such that the diamond body is formed on the boron nitride layer.

31. The method of claim 20, further comprising etching the silicon carbide mass to form a plurality of pits for diamond nucleation.

\* \* \* \* \*